(12) United States Patent
Morris et al.

(10) Patent No.: US 7,341,413 B2
(45) Date of Patent: Mar. 11, 2008

(54) SELF-PIERCING BLIND FASTENER

(75) Inventors: Stephen Morris, Sutton Coldfield (GB); Dan Smith, Birmingham (GB)

(73) Assignee: Newfrey LLC, Newark, DE (US)

( * ) Notice: Subject to any disclaimer, the term of this patent is extended or adjusted under 35 U.S.C. 154(b) by 396 days.

(21) Appl. No.: 10/654,072

(22) Filed: Sep. 3, 2003

(65) Prior Publication Data
US 2004/0107557 A1   Jun. 10, 2004

(30) Foreign Application Priority Data
Sep. 9, 2002   (GB)   ................... 0220824.7

(51) Int. Cl.
*F16B 13/04* (2006.01)
*F16B 19/08* (2006.01)

(52) U.S. Cl. ........................ 411/29; 411/501; 411/70; 411/60.1; 29/432.2; 29/798

(58) Field of Classification Search .............. 411/60.1, 411/501, 29, 70, 34, 41; 29/432, 798
See application file for complete search history.

(56) References Cited

U.S. PATENT DOCUMENTS

| | | | |
|---|---|---|---|
| 3,276,499 A | 10/1966 | Reusser | |
| 3,279,304 A | 10/1966 | Hopkins | |
| 3,559,445 A | 2/1971 | Hougen | |
| 3,750,518 A * | 8/1973 | Rayburn ..................... | 411/29 |
| 4,003,288 A * | 1/1977 | Jeal .............................. | 411/70 |
| 4,218,953 A | 8/1980 | Haytayan | |
| 4,428,214 A | 1/1984 | Head, Jr. et al. | |
| 4,629,380 A | 12/1986 | Gunkel et al. | |
| 4,781,500 A | 11/1988 | Mauer | |
| 5,054,977 A * | 10/1991 | Schultz ......................... | 417/43 |
| 5,056,207 A | 10/1991 | Ladouceur | |
| 5,252,014 A * | 10/1993 | Andrews ...................... | 411/43 |
| 5,441,417 A | 8/1995 | Ladouceur et al. | |
| 5,618,142 A | 4/1997 | Sondén et al. | |

(Continued)

FOREIGN PATENT DOCUMENTS

DE   1750560   3/1971

(Continued)

OTHER PUBLICATIONS

EP 1 396 646 A1 Search Report.

(Continued)

*Primary Examiner*—Katherine Mitchell
(74) *Attorney, Agent, or Firm*—Harness, Dickey & Pierce, P.L.C.

(57) ABSTRACT

A self-piercing blind fastener comprising a mandrel having an elongate cylindrical shell mounted on a stem of such mandrel and which extends co-axially about a central elongate axis of the blind fastener, the shell having a radially extending flange at one end and a tail-end portion at the opposite end for insertion through a workpiece, the mandrel further having a mandrel head in operative engagement with the tail-end of the fastener for transmitting a setting force thereto during setting of such fastener, the blind fastener further comprising a longitudinally extending indenting member extending co-axial with and away from the tail-end of the blind fastener, which indenting member having a cross sectional area less than the cross sectional area of the shell.

17 Claims, 6 Drawing Sheets

U.S. PATENT DOCUMENTS

| | | |
|---|---|---|
| 5,644,830 A | 7/1997 | Ladouceur et al. |
| 5,722,144 A | 3/1998 | Bora |
| 5,752,305 A | 5/1998 | Cotterhill et al. |
| 5,915,901 A | 6/1999 | Aasgaard |
| 6,042,313 A * | 3/2000 | Dehlke .................. 411/43 |
| 6,254,324 B1 | 7/2001 | Smith et al. |
| 6,263,560 B1 | 7/2001 | Edwards |
| 6,276,050 B1 | 8/2001 | Mauer et al. |
| 6,325,584 B1 | 12/2001 | Marko et al. |
| 6,338,601 B1 | 1/2002 | Mauer et al. |
| 6,362,448 B1 | 2/2002 | Röser |
| 6,385,843 B1 | 5/2002 | Singh et al. |
| 6,398,472 B1 | 6/2002 | Jones |
| 6,428,255 B1 | 8/2002 | Smith |
| 6,502,008 B2 | 12/2002 | Maurer et al. |
| 6,663,329 B2 | 12/2003 | Singh et al. |
| 6,802,682 B2 | 10/2004 | Stevenson et al. |
| 6,814,531 B2 | 11/2004 | Stevenson et al. |
| 6,877,646 B2 | 4/2005 | Paynter |
| 2002/0125297 A1 | 9/2002 | Stol et al. |
| 2003/0175095 A1 | 9/2003 | Clarke |
| 2003/0177626 A1 | 9/2003 | Paynter |
| 2004/0068854 A1 | 4/2004 | Kato et al. |
| 2004/0071526 A1* | 4/2004 | Lesecq .................. 411/501 |
| 2004/0162151 A1 | 8/2004 | Mauer et al. |
| 2005/0008455 A1 | 1/2005 | Guy |

FOREIGN PATENT DOCUMENTS

| | | |
|---|---|---|
| GB | 1 289 819 | 9/1972 |
| GB | 2 038 979 A | 7/1980 |
| GB | 2107626 | 5/1983 |
| IT | 1 113 461 B | 1/1986 |
| IT | 1113461 | 1/1986 |
| JP | 11153114 A * | 6/1999 |
| JP | 2000141066 | 5/2000 |

OTHER PUBLICATIONS

International Search Report PCT/EP2004/007915 dated Feb. 12, 2004.

* cited by examiner

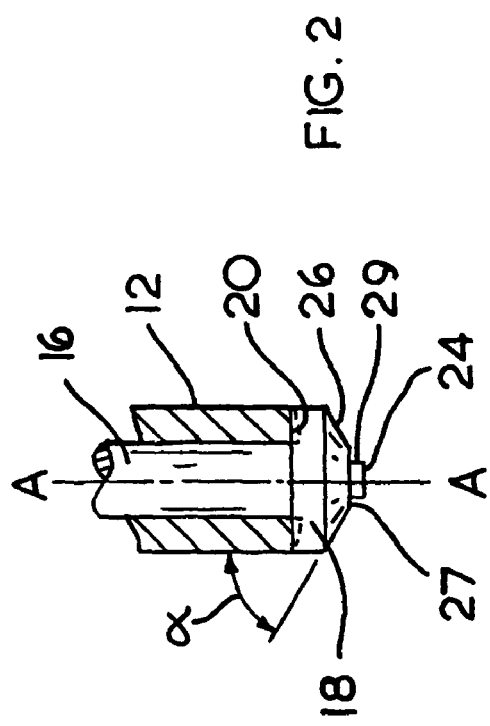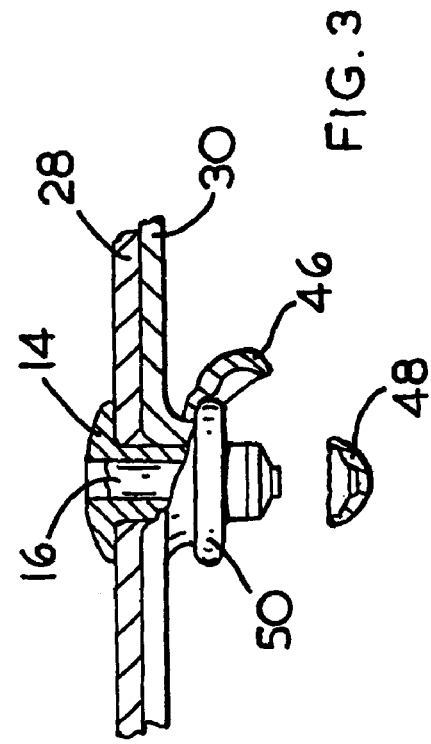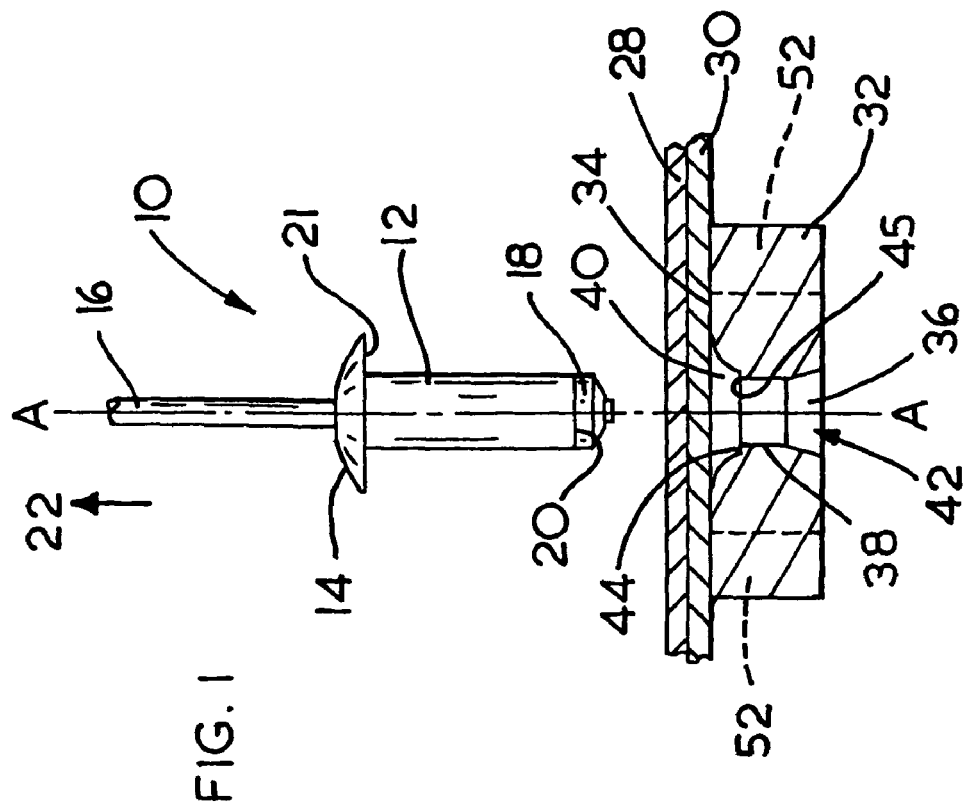

SELF-PIERCING BLIND FASTENER

FIELD OF THE INVENTION

The present invention relates to a fastening element used to secure together two or more workpieces and, more particularly, towards a self-piercing blind fastener of the type comprising a collapsible cylindrical fastener having a flange at one end and a mandrel extending therethrough to effect deformation of such fastener during a setting operation. The invention is also directed to a die for use during the insertion of such self-piercing blind fasteners and an apparatus and method for the setting of such self-piercing blind fasteners.

BACKGROUND OF THE INVENTION

There are many types of known fasteners available for fastening together two or more workpieces, including two main classes of a) self-piercing rivets and b) blind fasteners (specifically blind rivets). In particular, conventional blind rivets comprise an outer tubular shell or body having an enlarged flange at a first end, together with a mandrel associated therewith, such mandrel comprising a cylindrical stem extending through the tubular rivet body so as to be co-axial therewith, whereby the mandrel stem will have mounted towards one end thereof a mandrel head for engagement with the second, opposite, end of the tubular shell (usually in the form of an enlarged head which engages an end-face of the tubular rivet body remote from the enlarged flange). The blind rivet is then passed through a preformed hole in the workpiece until the flange engages with the edge of the hole and is then held in engagement therewith during a setting operation. During setting, the remote end of the rivet, which is disposed inwardly of the workpiece (the blind side) is then compressed towards the flange by drawing the mandrel stem, and hence the mandrel head, back towards the flange, whereby the engagement of the mandrel head with the rivet body effects compression of the tubular body between the flange and the remote end of the rivet, which deformed portion of the rivet body then compresses the workpiece therebetween with the flange itself.

There are many variants in the design of such blind fasteners including the provision of closed end blind fasteners, whereby the tubular body has the end opposed to the flange member which is substantially sealed and encapsulating the mandrel head (which engages with a reduced diameter inner surface of the tubular body to effect deformation during the setting operation), or alternatively the mandrel head may comprise a screw threaded member for complimentary screw threaded engagement with an internal surface of the cylindrical rivet body to allow a setting operation and deformation of the rivet. One of the major advantages of such blind rivets and fasteners is that the workpiece only needs to be accessed from one side since deformation of the "blind end" of the rivet is effected by a compressive force being applied thereto by drawing of the mandrel stem from the workpiece engaging side.

However, one of the major drawbacks of this type of blind fastener is the necessity that appropriate holes must be pre-drilled (or pre-punched) in the workpiece in order to allow the fasteners to be inserted therethrough for setting. Not only does this involve an additional manufacturing operation of pre-drilling (or punching) the holes, but maintaining one or more workpieces appropriately aligned following the drilling operation until the insertion of the rivet can be difficult. For example, there are instances in which the pre-formed holes are larger than specified due to the difficulties in hole alignment due to the accumulation of hole centre tolerances. This can occur where the workpiece is large and of relatively thin material (such as in an automotive body). Deformation of the hole edges during a punching operation can also result in holes of non uniform size and shape. Conventional blind rivets can also have difficulty in achieving the necessary hole filling and clamping performance in larger holes and there is also an attendant difficulty in insertion of the rivet through the workpiece materials due to hole mis-match. If the rivets cannot achieve good hole filling and clamping, especially where the joint is subjected to vibration or deflection, the parts can begin to move relative to one another resulting in squeaks and rattles.

To address such problems, self boring blind rivets have been developed which attempt to form the appropriate hole through the workpiece by use of a rotatable boring member formed on the rivet. However, the involvement and necessity of effecting rotation of the fastener prior to setting considerably complicates the required equipment to achieve such operation. In addition, due to the possible existence of small gaps between the workpieces during the self drilling operation, resultant displacement between such workpieces can occur when the rivets are set so that the quality of the rivet connection can suffer owing to shearing forces.

A further drawback of such rivets is the creation of debris during the rivet operation which could interfere with the rivet setting or be hazardous when used in securing electrical equipment.

A further, alternative fastener developed to address such problems is the self-piercing rivet, which effectively comprises a semi tubular rivet which is intended to be punched through an upper workpiece for its lower edge to be splayed into (but not penetrate) a lower workpiece, the splaying of the rivet being effected during a punching operation by use of an appropriate shaped die member placed beneath the workpieces. While effective, such punched tubular self-piercing rivets also incur certain drawbacks and notably requirement that the workpieces must be forcibly held together during setting and the inability to visually inspect the set rivet since it is, if correctly set, retained within the body of the lower workpiece. In addition, such self-piercing tubular rivets can only be used with workpieces of a minimum thickness to prevent their simply being punched through both workpieces and, since such rivets engage directly with the workpiece, they cannot be used in ductile materials such as plastics, where there are advantages in using a self-piercing blind rivet to achieve a reliable join.

It is therefore an object of the present invention to provide a self-piercing blind fastener which alleviates the aforementioned problems and specifically allows the setting of a blind fastener without the requirement of pre-drilling holes through the workpiece. It is also an object of the present invention to provide an appropriate supporting die and apparatus for inserting and fastening such self-piercing fasteners, together with an improved method of attaching blind fasteners to a workpiece which helps alleviate the aforementioned problems.

SUMMARY OF THE INVENTION

According to the present invention there is now provided a self-piercing blind fastener comprising a mandrel and an elongate cylindrical shell mounted on an elongate stem of the mandrel so as to extend co-axially about a central elongate axis of the blind fastener, the shell having a radially extending flange at one end thereof and a tail end at the opposite end for insertion through a workpiece; the mandrel having a mandrel head in operative engagement with the tail end of the shell for transmitting force thereto during setting of the fastener, characterised in that the blind fastener comprises a longitudinally extending indenting member extending co-axially with and away from the tail end of the blind fastener, this indenting member having a cross sectional area less than the cross sectional area of the cylindrical fastener. By reducing the cross sectional area of the indenting member, then the pressure applied to the workpiece as such fastener is forced there against is concentrated into this smaller area to more readily effect deformation and weakening of the workpiece to allow the fastener to be inserted therethrough. Preferably, the cross sectional area of the indenting member will be less than half (and ideally between 5% and 30%) of the cross sectional area of the cylindrical fastener itself.

For a conventional blind fastener, where the mandrel head extends at least partially through the shell so as to extend out of the tail end of such shell, the indenting member may be mounted on the mandrel head itself. Alternatively, for such blind fasteners having cylindrical closed-end shells, the indenting member may be mounted externally on a closed-end face of the tail-end of such shell.

In either of the aforementioned cases, the mandrel head will usually have a greater external diameter than the internal diameter of the cylindrical shell to thereby effect operative engagement between the enlarged head of the fastener and the cylindrical shell body. For open-end blind fasteners of this type, the external diameter of the mandrel head will usually correspond to the external diameter of the rivet body such that the head engages with an end-face of the cylindrical shell. Alternatively, for closed-end blind rivets, the mandrel head is retained within an end portion of the cylindrical shell and has an external diameter less than the external diameter of the fastener body but sits in an effective rebate on the internal surface of the shell.

Alternatively, the mandrel head may comprise an external screw thread for co-operative screw threaded engagement with an internal screw thread of the cylindrical shell in the region of the tail-end for effecting operative engagement therewith such that any force applied to the mandrel is transmitted through such screw threaded engagement to the cylindrical shell. In such an embodiment, the mandrel head itself may be retained within a closed-end shell or pass through an open-end cylindrical shell so as to project externally, and usually such external projection forming said indenting member.

Preferably, the indenting member will have an end-face extending at least partly perpendicular to the elongate axis of the fastener. Alternatively, or in combination, the end-face of the indenting member may be at least partially inclined so as to taper radially inwards towards the axis in a longitudinal direction away from the flange. Here such end-face may taper towards an apex or may taper towards a substantially flat surface extending at least partly perpendicular to the elongate axis. The end-face may also be domed.

Usually, the indenting member will also comprise a longitudinally extending side-wall so as to form a step portion extending from a periphery of the end-face towards the tail-end of the cylindrical body. Such a wall may extend parallel to the fastener axis or may be inclined thereto. Preferably the indenting member will comprise a cylindrical disk projecting away from the tail-end of the blind fastener.

Furthermore, it is preferred that the indenting member will also have associated therewith an axially inclined forming surface extending between the exterior diameter of the cylindrical shell and the indenting member. Such an inclined forming surface will preferable extend continuously between this indenting member and the external diameter of the shell or, alternatively, may extend partway therebetween. This inclined or tapered forming surface serves to deform the weakened portion of the workpiece as the fastener is pressed there against in an appropriate manner. Preferably such inclined surface face will be inclined relative to the fastener axis at an angle of between 50° and 80°. Where the blind fastener has an indenting member with an associated step portion, the inclined forming surface will extend between the exterior diameter of the shell at the base of the step portion.

Further, according to the present invention there is also provided a die for supporting a workpiece during setting of a self-piercing blind fastener, such die comprising a workpiece engaging support member having a cylindrical fastener receiving bore extending therethrough, which bore having a uniform mid section of constant diameter and a throat portion adjacent to an outer surface of the support member, which throat portion increasing in diameter towards this outer surface. Usually this increase in throat diameter will be non-linear such that the throat presents a substantially curved surface when viewed in cross section.

Preferably, the bore of such die will also comprise a radially extending shoulder between the mid section and the throat so as to form a cutting edge in the bore where such shoulder engages perpendicularly with the mid section.

Still further according to the present invention there is also provided a fastening system for inserting and setting a self-piercing blind fastener in a workpiece, such system comprising a die for supporting the rear of a workpiece during insertion of the fastener and a combined insertion setting tool, which combined insertion setting tool comprising an insertion member for engaging a shell of the blind fastener and for transmitting an insertion force thereto, together with a mandrel engaging member for engaging a mandrel stem of the fastener, which mandrel engaging member being displaceable relative to the insertion member for effecting relative displacement of the mandrel and the shell to effect setting of the blind rivet, further comprising displacement means for effecting relative displacement of the die and the combined insertion and setting tool linearly towards one another. Usually, the displacement means will comprise a hydraulic ram operatively engaged with one of the die or the combined insertion and setting tool with a frame member supporting the other of the die and the combined insertion and setting tool, whereby the hydraulic ram is displaceable towards the frame member so as to effect the relative displacement of the die towards the insertion and setting tool. Alternatively, both the die and the combined insertion setting tool may have associated rams to be both displaceable towards one another.

Still further according to the present invention there is also provided a method of attaching an elongate blind fastener to a workpiece comprising the steps of providing the fastener with an indenting member at one longitudinal end thereof remote from a flange of the fastener, which indenting member having a cross sectional area less than half the cross sectional area presented by a shell of the fastener, subsequently effecting relative displacement of the fastener towards the workpiece so as to bring the indenting member into engagement with such workpiece, following which applying an insertion force to the indenting member through the fastener to as to deform the workpiece and subsequently drive the fastener through the deformed, and subsequently weakened, workpiece until the fastener flange engages the workpiece, whereby the flange is then retained in engagement with the workpiece during setting of the blind fastener in a conventional manner. It is preferred the method further comprises the step of supporting a rear surface of the workpiece during deformation and penetration thereof by the fastener, usually by use of an appropriate forming die.

Preferred embodiments of the present invention will now be described, by way of example only, with reference to the accompanying illustrative drawings in which:

BRIEF DESCRIPTION OF THE DRAWINGS

FIG. 1 is a schematic view of a self-piercing blind fastener according to the present invention aligned with an appropriate setting die (shown in cross section); and FIG. 2 is an enlarged part sectional view of a tail-end of the fastener of FIG. 1; and FIG. 3 is a part sectional view of the self-piercing blind fastener of FIG. 1 in a set configuration with associated workpieces.

DETAILED DESCRIPTION OF THE PREFERRED EMBODIMENTS

Figure 4:
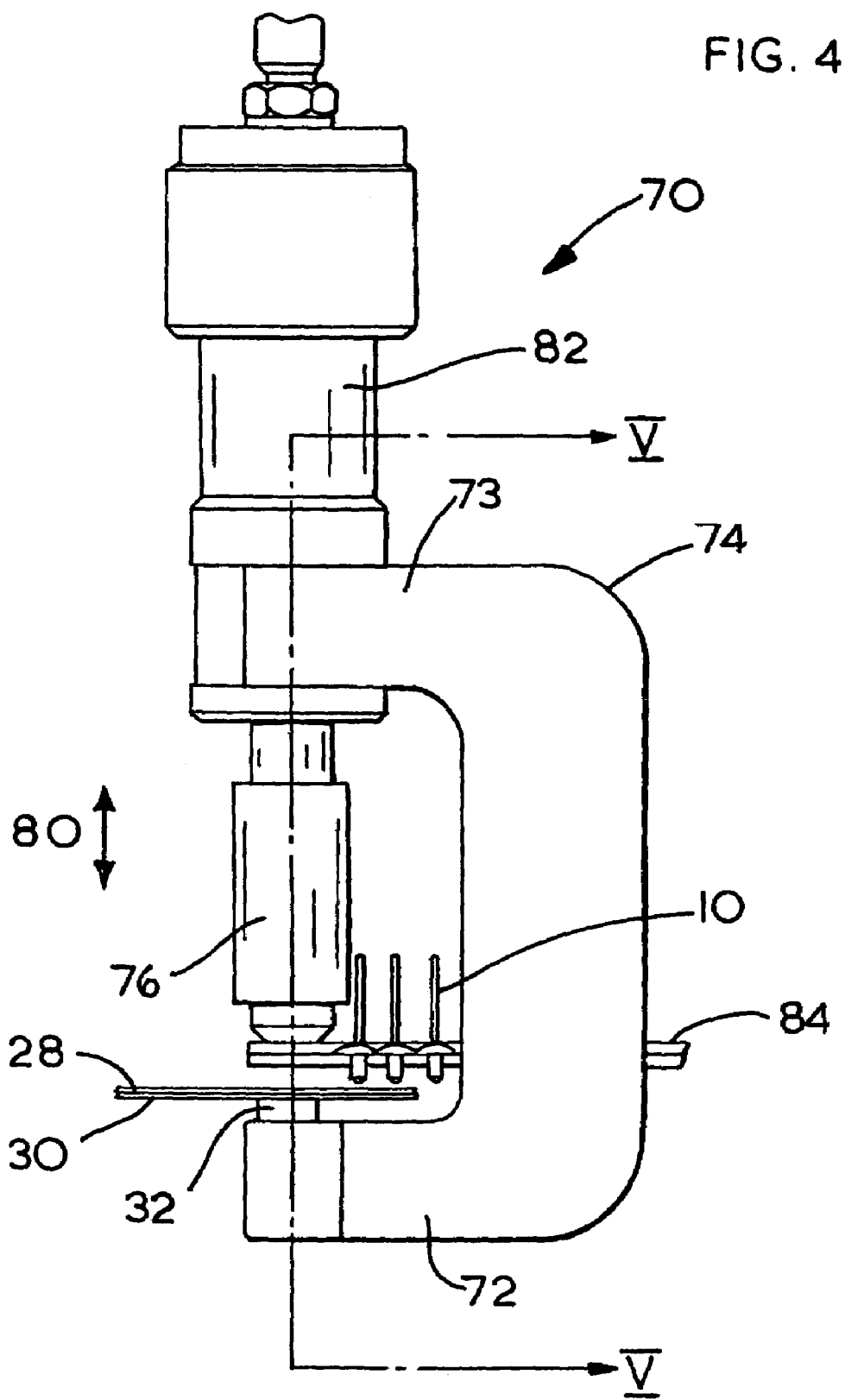
FIG. 4 is a side elevation of a combined insertion and setting tool for a self-piercing blind fastener according to the present invention.

Referring now to FIG. 1 there is shown a self-piercing blind fastener, which in this example is a blind rivet, (10) comprising a hollow cylindrical metal body (rivet) (12), which is longitudinally extending and has an elongate central axis shown as 'A' in FIG. 1. At a first end of the cylindrical metal body (12) there is provided a radially extending domed flange member (14) having an outer diameter greater than the exterior diameter of the cylindrical body (12). The rivet (10) further comprises a mandrel having a cylindrical mandrel stem (16) which passes through the hollow metal body (12) so as to be co-axial therewith. The mandrel also comprises a mandrel head (18) mounted at one end of the mandrel stem (16) which engages with a tail-end (20) of the rivet body (12) in a conventional manner, and as clearly seen in FIG. 2. The mandrel head (18) is integrally formed on the mandrel stem (16) so as to be again be co-axial about axis A of the fastener and has a maximum outer diameter equivalent to the maximum outer diameter of the rivet body (12).

Extending radially between the mandrel stem (16) and the outer diameter of the mandrel head (18) is a shoulder portion substantially perpendicular to the mandrel stem (16) which engages and abuts the tail-end face (20) of the rivet body (12) as is conventional. The mandrel stem (16) has a diameter substantially equal to the inner diameter of the body (12) so as to be held in close fitting frictional engagement therewith. In this manner, blind rivets of this type are conventional and well understood within the art.

In operation, this type of conventional blind rivet will then be inserted through a preformed hole in one or more workpieces, which hole having been formed with diameter similar to the exterior of the diameter of the body (12), until such time an inner shoulder (21) of that the flange member (14) will abut an upper surface of such workpiece. An appropriate setting tool is then employed which has an outer rivet engaging portion which engages and holds the flange (14) firmly against the workpiece while the mandrel stem (16) is then grasped by an inner displaceable jaw mechanism and displaced in the direction shown generally by arrow (22) in FIG. 1 as the body (12) is restrained from displacement in such direction. The resultant compressive force effected by movement of mandrel (16) in direction (22) is then transferred, through the mandrel head (18), to the tail-end (20) of the rivet body (12) until sufficient force is exerted to result in compressive deformation of the cylindrical rivet body (12) towards the flange (14), with the deformed body (20) engaging the rear side of the workpiece so as to compress the workpiece or pieces between the flange (12) and the deformed tubular body (12) as shown substantially in FIG. 3. Engagement of the deformed portion with rear side of the worksurface then prevents continued displacement of the mandrel stem (16) in direction (22), whereby a force exerted thereon subsequently increases until the mandrel fails at a preformed weakened region (or neck) as is again conventional. In this particular type of blind rivet the mandrel head will then be retained in engagement with the rivet body once the mandrel stem has been removed. This represents a conventional setting operation for a blind rivet.

The invention resides in the modification to this type of blind rivet and specifically for the embodiments shown in FIGS. 1 through 3, to modification of the mandrel head (18). As best seen in the enlarged view of FIG. 2, the mandrel head (18) is further provided with an indenting member (24) which comprises a cylindrical solid disk mounted co-axial with the axis A of the fastener (10) and projecting longitudinally away from the rivet body (12) in a direction away from the flange (14). This indenting member (24) has a diameter significantly less than the maximum diameter of the rivet body (12) so as to present an end-face, perpendicular to axis A, having a cross sectional area significantly less than the cross sectional area defined by the diameter of the rivet body (12). In this embodiment, the diameter of the member (24) is approximately 25% of the diameter of the body (12) although such diameter can vary so as to preferably lie in the range of between 30% and 70% of the maximum diameter of the body (12), so as to present a cross sectional area less than 50% of that presented by the rivet body.

In this embodiment, the disk shaped indenting member is provided with an outer cylindrical side wall (29) which extends parallel to the axis (A), and supports substantially flat, circular end face, remote from the rivet body (12).

Ideally, the area presented by the end face of the indenting member (24) should be less than half the area presented by the cross sectional area of the rivet body (12) and such total area of the indenting member (24) will preferably lie within the range of 5% and 50% (although, ideally, between 5% and 30%) of the maximum cross sectional area of the body (12). The important feature here is that the indenting member (24) presents a workpiece engaging surface having a cross sectional area substantially less than that presented by the cross sectional area of the body (12).

The mandrel head (18) is further provided with an outwardly directed conical forming surface (26), again formed co-axial about axis (A), such conical surface (26) tapering from the maximum outer diameter of the mandrel head (18) towards the indenting member (24) in a direction away from the flange (14) of the fastener (10). This conical surface (26) may extend completely between the indenting member (24) and the outer diameter of the mandrel head (18) or, as shown in FIG. 2, may extend partially between these two extremes whereby a shoulder portion (27) is formed between the indenting member (24) and the forming surface (26), which shoulder portion extends substantially perpendicular to axis A.

Preferably, the conical forming surface (26) will be inclined at an angle α relative to the axis A, the angle α preferably lying within the range 30° to 80° and shown at an optimum angle of 60° in FIG. 2.

The main advantage of the modified design of blind rivet as shown in FIGS. 1 and 2 is the ability for such blind rivet to be inserted through a workpiece prior to setting without the necessity of pre-drilling holes therethrough. As shown in FIG. 1, the workpieces (in this particular example two sheets of thin metal (28) and (30)) which are to be connected together, are supported by an improved design of die (32). This die (32) comprises an upper support surface (34) for receiving and supporting the rear of the workpiece (30) and has a bore (36) extending therethrough from this upper surface (34) so as to have a bore axis extending perpendicular to the upper surface (34). The bore (36) comprises a main tubular mid section (38) having a uniform cross section having a constant diameter, such diameter of the mid section (38) corresponding to the diameter of the tubular body (12) of the blind rivet. Adjacent to the upper support surface (34), the bore (38) extends into a throat portion (40) wherein the diameter of the throat portion increases towards the upper surface (34), whereby the increase in diameter is non-linear so that the rate of increase in diameter of the throat towards the upper surface (34) also increases so as to provide an internal curved surface of the throat portion as shown in FIG. 1. The opposed end of the mid section (38) of such bore is then provided with a clearance portion (42) which again has increasing bore diameter in a direction away from the support surface (34), such diameter of the clearance portion (42) increasing linearly away from the mid section.

As can also be seen from FIG. 1, the bore (36) is further provided with a stepped portion (44) between the mid section (38) and the throat portion (40), effected by a sudden increase in diameter between the mid section (38) and the inner end of the throat (40) subsequently creating a shoulder within the bore whereby the inner diameter of this shoulder (equal to the diameter of mid section (38)) forms a cutting edge (45) as will be described below.

In operation, the workpieces (28, 30) are positioned on the upper surface (34) of the die (32), as shown in FIG. 1, whereby the blind rivet (10) is aligned with the die (by use of appropriate positioning and setting tools to be described below) such that the rivet axis A is aligned co-axially with the axis of the bore (36). Prior to the setting operation of the rivet (10), relative displacement between the rivet (10) and the die (36) is effected (again as will be described below) so as to bring the modified mandrel head (18) into abutment with a front surface of workpiece (28) so as to effect engagement of the outwardly directed end-face of the indenting member (24) with such workpiece (28). Continued relative displacement of the rivet (10) towards the die (34) results in the indenting member (24) stretching and deforming the workpieces (28, 30) into the throat (40) of the die (32), such deformation serving to cause a thinning of the workpieces, which weakened and thinned material is then engaged by the conical forming surface (26) of the mandrel head which, due to its weakened state, is readily displaced and formed against the throat (40) of the die, which serves to form the stretched workpiece materials to give a plunged hole therethrough (FIG. 3). Subsequently, as penetration of the indenting member (24) increases, the material stretch exceeds its yield strength and ruptures to either create an attached cap (46) (FIG. 3) or a separate pierced slug that can subsequently be removed through the bore of the die. Effectively, where the die is provided with an appropriate stepped portion (44) so as to form the cutting edge (45) as previously described, the deformed workpiece is forced against this cutting edge (45) so as to cut out the separate pierced slug (48) as the rivet is inserted therethrough. Alternatively (although not shown) the cutting edge of the bore can be removed such that the throat diameter blends smoothly with the diameter of the mid section of the bore whereby the absence of the such cutting edge will result in rupture of the weakened workpiece about approximately 90% of its periphery whereby the resultant cap (46) will then be retained on the rear of workpiece (30) as shown in FIG. 3.

Once the rivet has formed the plunged hole therethrough, the die may be wholly or partially withdrawn away from the rear of the workpiece simultaneously to activation of an appropriate setting tool (as will be described) to effect displacement of the mandrel (16) in the direction (22) as shown in FIG. 1 as previously described, so as to set the blind rivet (10) in a conventional manner and as shown in FIG. 3, whereby the workpieces (28, 30) are compressed between the flange (14) of the rivet body (12) and the deformed portion (50) of the body (12).

As mentioned, the die (32) may be wholly removed from the rear of the workpiece to allow the setting operation to be effected or may be partially removed (as indicated in dotted lines in FIG. 1) so as to remove the bore portion (36) away from the workpiece while the remaining end sections (52) of such die may remain to provide appropriate support to the workpiece.

A major advantage of self-piercing blind rivets of the type described above is achieved by the formation of an appropriate indenting member (24) having a cross sectional area significantly less than the cross sectional area of the rivet body. In this manner, the pressure applied to the workpiece through the rivet body can be concentrated so that a relatively low insertion force applied to the rivet is concentrated in a much smaller area thereby increasing pressure applied to the workpiece which allows the workpiece to be stretched as a result thereof and the resultant thinning of the workpiece by such a stretching operation then allows it to be more readily deformed by the larger forming surface (26). This allows for a significantly reduced force to be employed so as to achieve piercing of the rivet through a workpiece than would be normally be required by simply trying to force a rivet or mandrel head having the maximum diameter. This is important since one of the major requirements of this type of blind rivet is the ability to deform the body (12) of the rivet so as to achieve appropriate setting, necessitating a comparatively weakened rivet body (so as to be readily compressed during setting) which would be unable to transfer a high force to the mandrel head to achieve appropriate penetration. Thus the difficulties of the inherent weakness of the rivet body is overcome by the modified design utilising an indenting member having a significantly reduced cross sectional area.

Figure 8A:
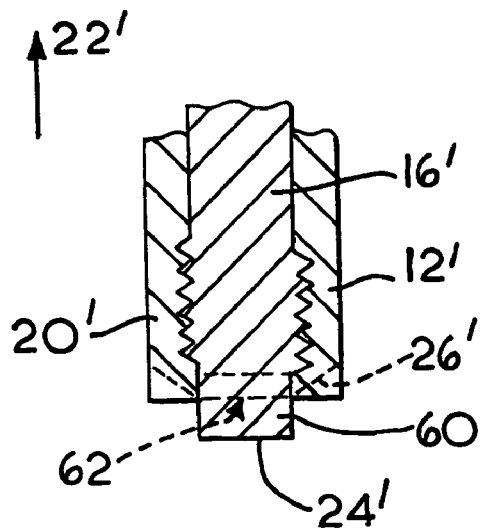
FIG. 8a is a cross sectional view of the tail-end of an alternative self-piercing blind fastener according to the present invention.
Figure 8B:
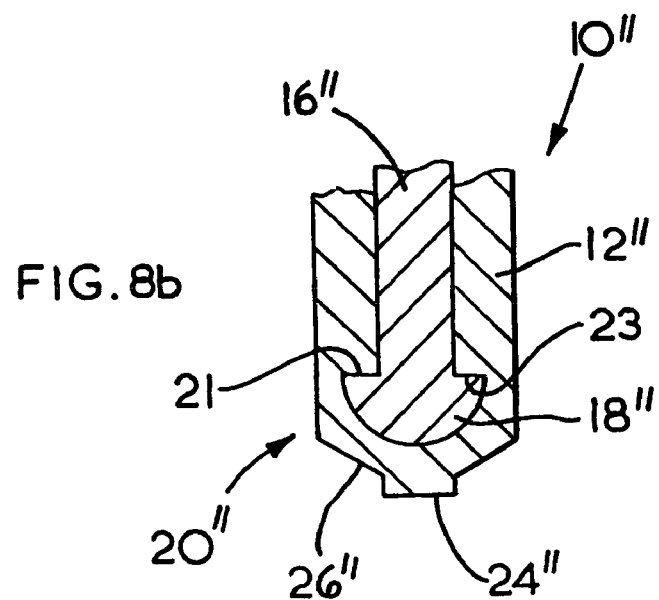
FIG. 8b is a cross sectional view of the tail-end of a second alternative self-piercing blind fastener according to the present invention.
Figure 8C:
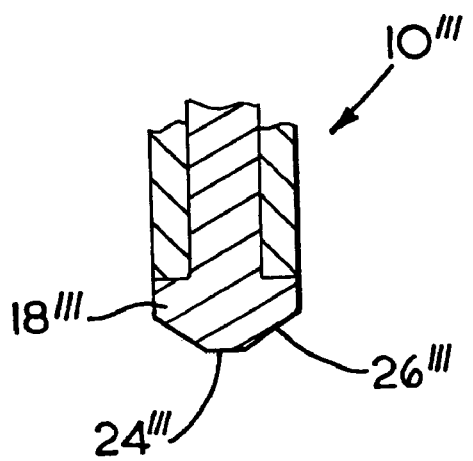
FIG. 8c is a partial cross sectional view of the tail-end of a third alternative embodiment of a self-piercing blind fastener according to the present invention.

Variations of this basic inventive concept and its application to similar and different types of blind rivets are readily conceived and, three examples of which are now shown in FIGS. 8a through 8c where like parts of their alternative fasteners utilise the same reference numerals. Firstly, referring to FIG. 8a, blind fasteners are also able to be set by effecting a screw threaded engagement between an outer screw thread on a mandrel stem (16') for complimentary engagement with an internal screw thread on a rivet body (12') so that displacement of the mandrel in the direction (22') relative to the rivet body (12') will again result in appropriate deformation of the rivet body in a conventional manner (an example of such blind fasteners is that sold by the applicant under the Trademark POPNUT®). Again this conventional design of blind fastener can be modified so that an end portion (60) of the mandrel stem (16') projects externally past the tail-end (20') of the rivet body so as to form an indenting member (24'), which is again mounted co-axial with the rivet body and has a cross sectional area considerably less than the cross sectional area defined by the outer diameter of the rivet body. Here the appropriate conical forming surface (26') can be optionally formed in the tail-end (20') of the rivet body (as illustrated by the dotted lines in FIG. 8a) or may be omitted completely. This conical forming surface (26') could also extend across the indenting member (24') such that the side walls of such dish shaped member are also inclined relative to the rivet axis. While such a conical forming surface (26') is preferable since it aids in the stretching and deformation of the weakened workpiece effected by the indenting member (24'), the invention is equally applicable if such forming surface was perpendicular to the axis as shown in FIG. 8a as this will also eventually engage the weakened portion of the workpiece to continue stretching until appropriate failure allowing the rivet to be inserted therethrough. As can be also seen in FIG. 8a, the use of screw threaded engagement between a mandrel (or other fastening such as a bolt) within the fastener body need not extend through the tail-end (20') of the rivet body but may be retained therein, wherein the tail-end of the rivet body (20') may in fact be sealed (as again indicated by the dotted lines (62) in FIG. 8a). This type of rivet is known as a closed-end blind rivet and is again conventional within the field of fasteners and need not be described in any great detail. However, where such closed-end blind rivets are employed the indenting member may be formed directly on the sealed end of the rivet body. This is better shown in the embodiment of FIG. 8b showing a conventional closed-end blind rivet (10") having a mandrel stem (16") with an appropriate enlarged mandrel head (18") retained within a closed-end tubular rivet body (12"), in a conventional manner such that the enlarged mandrel head (18") has a radially extending shoulder (21) which cooperates with an internal shoulder (23) formed on the inner surface of the rivet body (12"). Such closed-end blind rivets are formed by inserting the mandrel head through the rivet body having a corresponding internal diameter and then passing the entire unit through an appropriate die so as to compress the rivet body around the inserted mandrel and mandrel head as shown. Such a closed-end blind rivet (10") as shown in FIG. 8b is then modified so as to encompass the present invention by forming a modified closed-end face at the tail-end (20"), wherein this tail-end face is provided with an appropriate indenting member (24") and associated conical surface (26").

FIG. 8c shows yet a further variant of the present invention whereby a self-piercing blind rivet (10''') corresponds substantially to that shown in FIG. 1 with the exception of variation to the mandrel head (18''') and specifically the relationship between the conical forming surface (26''') and the indenting member (24'''). Here the indenting member (24''') simply comprises an end-face having a reduced diameter but without the stepped side wall portion (29) as shown in the embodiment in FIG. 2. Again, this indenting member (24''') is able to effect stretching of the workpieces as it is forced there against which stretching is continued by the inclined conical forming surface (26''').

There are a considerable number of variants to the present invention, which although are not shown in the drawings, are readily understood from the following description. For example, while the indenting member (24) shown in the embodiment in FIG. 2 comprises a circular disk with an associated conical forming surface (26), it will be appreciated that the end-face of such an indenting member (24) need not be circular but could be any polygonal shape, provided that it is co-axial with the rivet body (12) and substantially symmetrical about such axis so as to apply a uniform indenting force against the workpiece. Similarly, the conical forming surface (26) need not be conical but could also be polygonal to reflect the specific polygonal shape of the indenting member. For example the indenting member (24) could, in fact, be square having four inclined forming surfaces extending outwardly towards the periphery of the rivet body. Similarly, while the embodiment shown in FIG. 2 utilises an indenting member (24) with perpendicular walls (29) extending parallel with the axis A, such walls (29) need not be parallel but could in fact incline relative to axis A, whereby such angle of inclination can be varied until it corresponds with the angle α of the conical surface, to reflect the embodiment shown in FIG. 8c. Still further, while the conical surface shown in the embodiments house a uniform angle α it will be appreciated that α could vary such that the forming surface (26) could in fact be domed as opposed to conical. Alternatively, the forming surface could also be stepped.

Also, while the preferred embodiments of self-piercing blind rivets shown in the figures utilise a flat end-face on the indenting member (24) which extends perpendicular to axis A, this end-face could in fact be domed or in fact could be pointed so as to form a further conical surface tapering towards an apex co-axial with the axis A.

While it is preferred that the mandrel head outer diameter of the embodiments shown in FIGS. 1, 8a and 8c, is equal or comparable to the outer diameter of the rivet body, it can in practice be larger, the requirement being the relative cross sectional area of the indenting member relative to the rivet body, as described above.

It is to be appreciated that all the variants discussed herein are applicable to all types of blind fastener.

Referring now to FIG. 4, a first embodiment of a combined insertion and setting tool for the self-piercing blind rivet of FIG. 1 is shown. Such a self-piercing riveting tool (70) comprises a conventional "C" frame (74) commonly associated with a tubular self-piercing rivets which is modified to carry the die (32) on its lower arm (72) and mounted on the upper arm (73) of the "C" frame (74) is a combined insertion and rivet setting head (76) which is better seen in FIG. 5. The combined insertion and rivet setting head (76) is linearly displaceable in a direction (80) towards and away from the die (32) by means of a hydraulic insertion ram (82). Rivets (10) are fed from a conventional vibratory bowl feeder along an appropriate raceway (not shown) to be fed, via an appropriate escapement mechanism (84), to a position beneath the insertion and setting head so as to provide automatic feeding of such rivets into the insertion and setting head (76). Such feeding, selecting and escapement parts being commonly used within the fastener industry are not described in any great detail herein.

In operation, an appropriate workpiece (28, 30) is positioned so as to lie between the combined insertion and setting head (76) and the die (32), as shown, either by manipulation of the workpiece relative to the "C" frame (74) or by movement of the "C" frame (74) relative to the workpiece by an appropriate computer controlled robotic arm (not shown).

Figure 5:
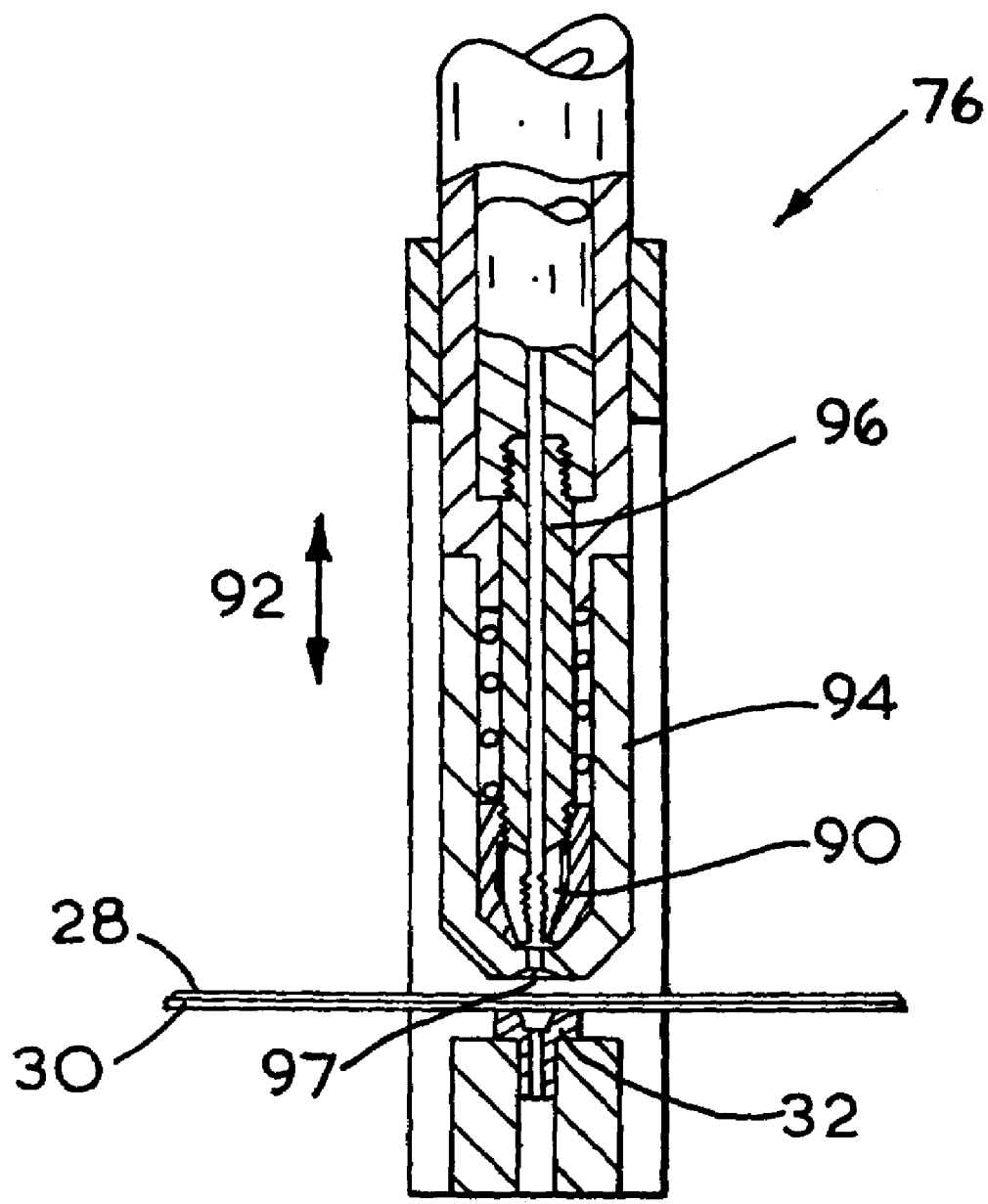
FIG. 5 is a cross sectional view along the lines V-V of the setting tool of FIG. 4.

Referring now to FIG. 5 the combined insertion and rivet setting head (76) is shown in cross section. This head (76) comprises conventional mandrel pulling jaws (90) displaceably mounted within such head to be linearly moveable in a direction (92) perpendicular to the workpiece (28, 30) and die (32). The head (76) further comprising a rigid insertion member (94) which is immoveable in respect to the head (76) itself, thereby allowing the jaws to be displaceable relative thereto as is conventional for a blind rivet setting tool. The jaws (90) are connected to an appropriate drawing bar (96) which is connected to an appropriate piston member (not shown) so as to effect appropriate displacement of the jaws (90) relative to the head (76) and the insertion member (94). The use of a piston mechanism controlled by an appropriate hydraulic or pneumatic impeller is conventional for blind rivet setting tools and readily incorporated into the present invention without need of further detailed description. In addition, as seen in FIG. 4, the entire head (76) is also displaceable in the direction (92) by operation of the appropriate ram member (82).

In operation, the head (76) is firstly raised so as to receive the mandrel (16) of an appropriate rivet (10) which will be inserted by an appropriate pusher mechanism from the escapement into a position so that the axis of the rivet (10) is coincident with a central axis of the head (76). In this position, the mandrel (16) will then be gripped by the jaw members (90) while the domed flange (14) of the rivet body will be received in a complimentary domed recess (97) within the insertion member (94). The ram (82) is then activated to displace the head (76), and specifically the insertion member (94), with the rivet inserted therein in a direction towards the workpiece (28, 30). As seen in FIG. 5 the head (76) is positioned so as to be axially aligned with the die (32) so as to position the rivet in the position relative to both the workpiece and the die substantially as shown in FIG. 1. The ram is then further activated so that the tail-end region (20) of the rivet and the indenting portion (24) are then driven under steady impact movement through the workpiece materials, as described with reference to FIG. 1, by a downward movement of the head (76). A penetration force will be transmitted from the insertion member, through the rivet body (12), to the mandrel head (18).

Once the rivet body has been driven through the workpiece such that the flange member (14) is in engagement with the upper surface thereof, the flange (14) is rigidly held in engagement with the workpiece by the ram and insertion member (94), the die is subsequently moved away from the workpiece, whereby the piston member of the head (76) (not shown) is then actuated so as to effect displacement of the drawbar (96) within the head to effect relative upward displacement of the jaws (90) within the head (76) in an upwards direction in FIG. 5, away from the workpiece so as to effect relative displacement between the mandrel head and the flange (14) of the rivet body to set the blind rivet in a conventional manner.

Figure 6:
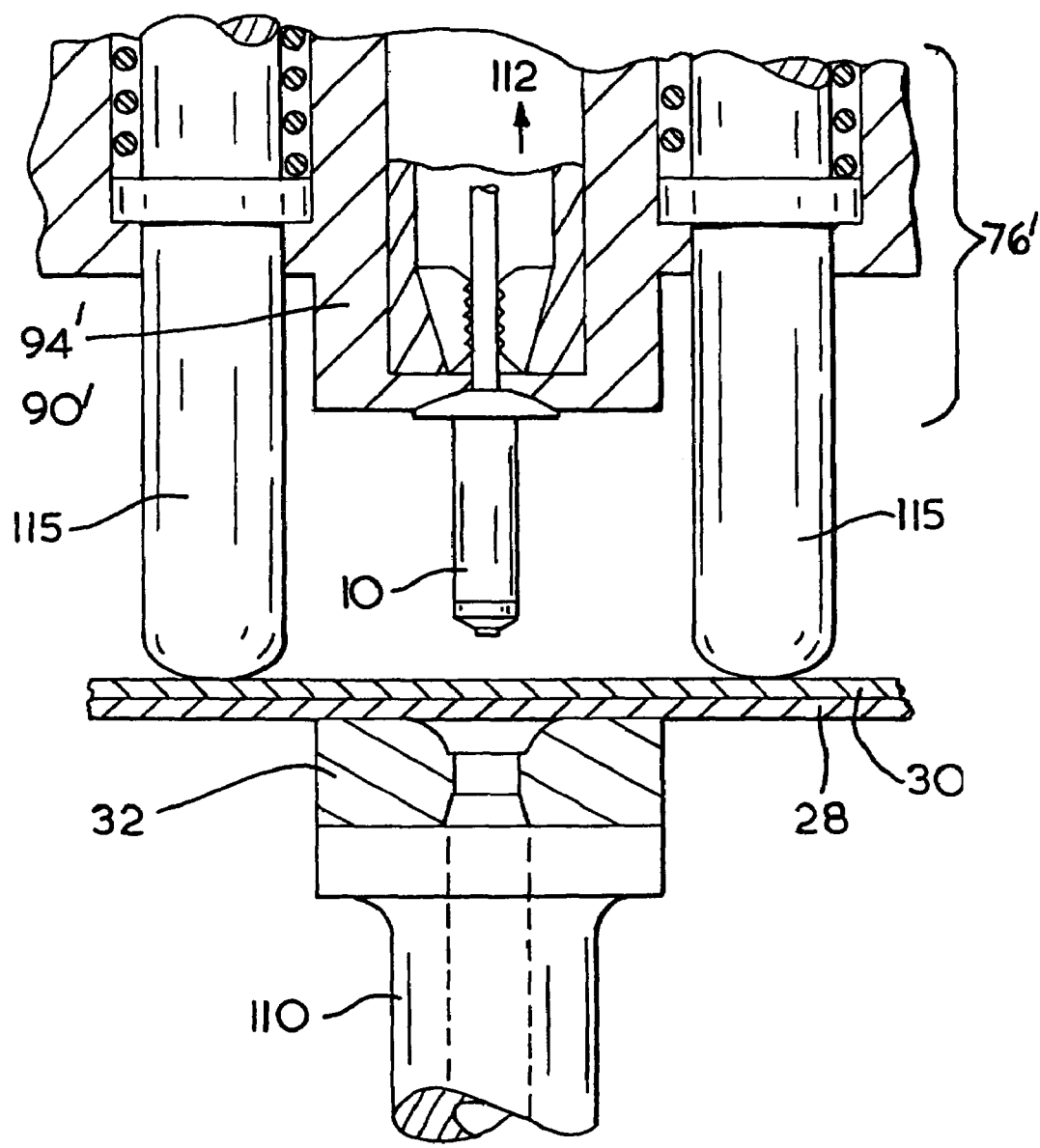
FIG. 6 is an alternative insertion and setting tool for a self-piercing blind rivet.

Referring now to FIG. 6, a modified self-piercing blind rivet system is illustrated. Here, the system is modified slightly so that instead of a ram being used to drive the combined head (76) towards the die as in the earlier embodiment, here a hydraulic ram (110) is used to drive a die (32) (with a workpiece (28, 30) mounted thereon) towards a combined insertion and setting head (76') having a stationary insertion member (94'), which insertion member is rigidly attached to an appropriate rigid frame (not shown). The insertion member (94') again has an appropriate jaw member (90') displaceably mounted therein so as to effect conventional setting of the blind rivet (10) in a known manner by drawing the mandrel in a direction (112) when the rivet is to be set while the setting member (94') restrains displacement of the rivet body during setting. Here, relative displacement of the rivet (10) towards the workpiece (28, 30) to achieve self-piercing is achieved by displacement of the workpiece, by use of the die (32) towards the stationary supported rivet (10).

In the embodiment shown in FIG. 6, the self-piercing blind rivet system is further provided with two spring-loaded support pillars (115) which serve to hold the workpiece away from the rivet (10) prior to insertion, but which spring-loaded pillars may be depressed, under the action of displacement of the die (32), towards the insertion member (94') to allow the rivet to be brought into engagement with the workpieces and pierced therethrough as previously described. Once the rivet (10) has been pierced through the workpiece (28, 30), the die is again removed and the rivet may then be set by appropriate displacement of the jaw members (90') in a conventional manner. These spring-loaded pillars further serve to help facilitate removal of the workpiece material away from the insertion member once the setting has been completed and the die (32) removed.

Figure 7:
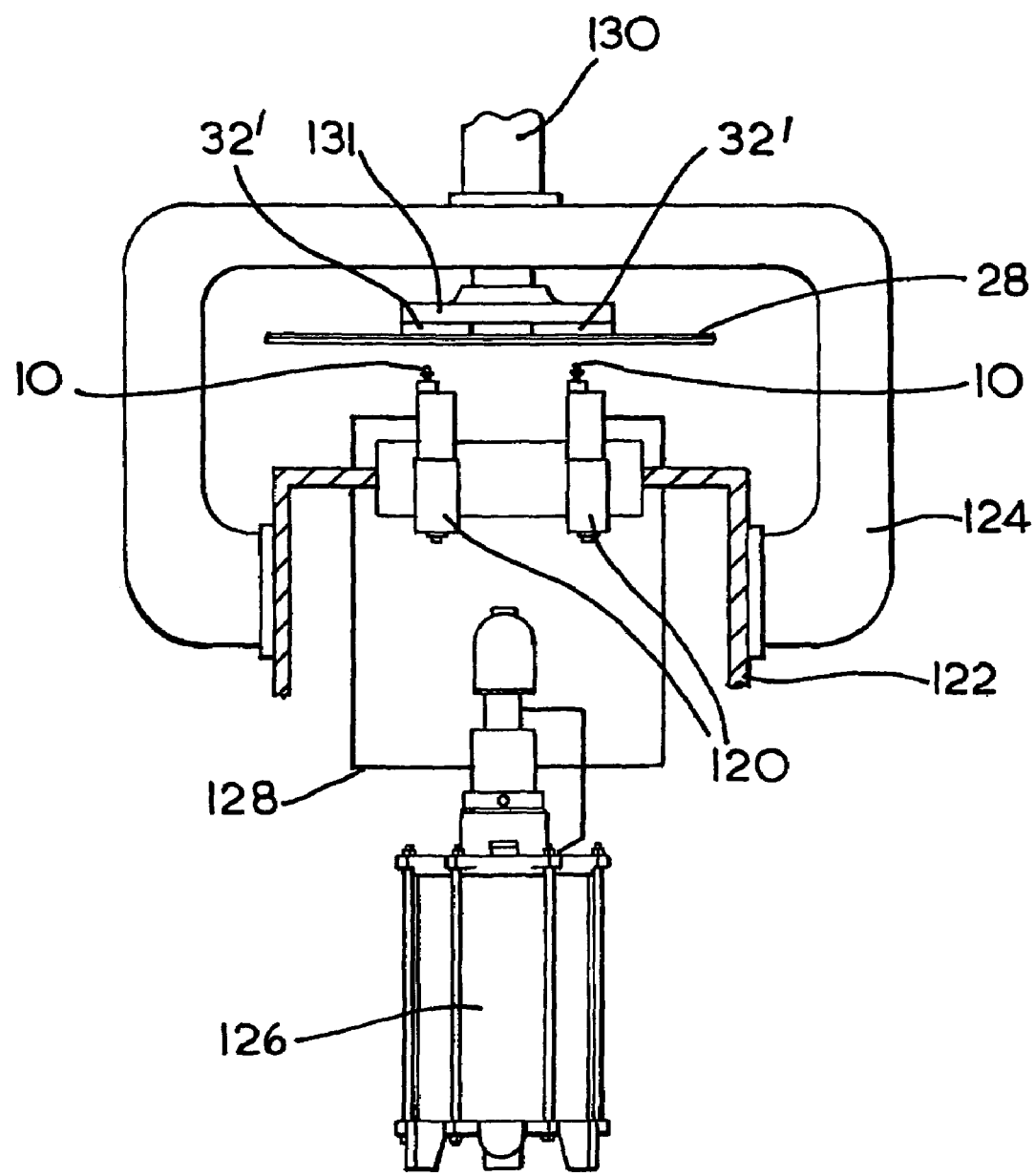
FIG. 7 is a schematic view of a self-piercing blind rivet multi-head setting system for inserting and setting self-piercing blind rivets according to the present invention.

FIG. 7 schematically illustrates the application of the self-piercing operation to a blind rivet multi-head setting system. The multi-head system shown in FIG. 7 comprises two rigidly mounted blind rivet setting heads (120) although the number of heads can vary from two to several tens. The setting heads (120) are mounted on an appropriate rigid bench (122) which also has mounted thereon an appropriate support frame (124). Each of the setting heads (120) comprises the combined insertion and setting head described with reference to FIG. 6 each of which has a conventional blind rivet setting mechanism employing internally displaceable jaws which, on actuation, will effectively draw a blind rivet mandrel into the setting head so as to effect setting of such rivet in a conventional manner. Each set of jaws ultimately controlled by an appropriate hydraulic intensifier (126) via appropriate hydraulic hoses (128) in communication with piston mechanisms (not shown) in each head (120). As for the embodiment shown in FIG. 6, each of the heads (120) receives an appropriate self-piercing blind rivet (10) and the workpiece (28) is then displaced into engagement with such rivets (10) by displacement of an appropriate die carrier (131) supporting two dies (32') (each die (32') having an appropriate bore positioned co-axially with each of the setting heads (120)) and which dies (32') are driven towards the setting heads (120) by an appropriate hydraulic ram (130). Again, the relative displacement between the dies (32') and the rigidly supported rivet (10) will result in the rivets (10) being driven through the workpiece into the bores of each associated die as previously described. Once the rivet bodies have pierced the workpiece the setting heads (120) are then activated in a conventional manner to set each of the blind rivets.

In the embodiments described herein the piercing force applied to the self-piercing blind rivet is achieved by engagement of the flange member (14) with the appropriate insertion member (94) to transmit appropriate force through the cylindrical rivet body, either to its closed-end directly or to the mandrel head which is engaged with the tail-end of the body. However, it is also possible that during the piercing operation the jaw members (90) can be secured from displacement relative to the insertion member (94) so that such piercing force can also be transmitted co-jointly through the mandrel stem as well as the rivet body to the tail-end of the self-piercing blind rivet.

In the preferred embodiments described herein the mid section (38) of the bore (36) is provided so as to be of comparable diameter to that of the rivet being inserted therethrough. This, obviously, necessitates removal of the bore portion of the die prior to setting so as to allow the rivet body to be expanded as it is deformed to the configuration shown in FIG. 3. However, it is also possible that the bore (36) may have a diameter considerably greater than that of the rivet body to thereby provide appropriate support to the rear of the workpiece during the self-piercing operation but which need not be removed from providing such support during the setting operation. In such an option the bore may optionally have the throat portion removed or retained dependent on the setting requirements. While it is preferred to utilise the throat portion (40) so as to deform the rear of the workpiece to provide an appropriate support as shown in FIG. 3 this is optional. It is also possible that the die itself may be completely omitted for use during the setting of such self-piercing blind rivets if the workpieces are sufficiently thin enough and the inherent deformation of the workpieces around the pierced hole is deemed acceptable for certain fastening operations.

The invention claimed is:

1. A self piercing blind fastener comprising:
   a mandrel;
   an elongate cylindrical shell mounted on an elongate stem of said mandrel so as to extend co-axially about a central elongate axis of said blind fastener;
   said shell having a radially extending flange at one end thereof and a tail end at the opposite end for insertion through a workpiece;
   said mandrel having a mandrel head in operative engagement with said tail end of said cylindrical shell for transmitting force thereto during setting of said fastener; and
   a longitudinally extending indenting member extending co-axial with and away from said tail end of said cylindrical shell, said indenting member having a cross sectional area less than the cross sectional area of an outside surface of said cylindrical shell,
   wherein said indenting member has an end face extending at least partly perpendicular to said elongate axis,
   wherein said indenting member comprises a longitudinally extending side wall forming a step portion extending from a periphery of said end face towards said tail end of said cylindrical shell.

2. A blind fastener as claimed in claim 1 wherein said cross sectional area of said indenting member is less than half the cross sectional area of an outside surface of said cylindrical shell.

3. A blind fastener as claimed in claim 1 wherein said indenting member is mounted on said mandrel head.

4. A blind fastener as claimed in claim 1 wherein said mandrel head has a greater external diameter than an internal diameter of said cylindrical shell for effecting operative engagement therewith.

5. A blind fastener as claimed in claim 1 wherein said indenting member has an end face which is at least partially inclined so as to taper radially inwards towards said axis in a longitudinal direction away from said radially extending flange.

6. A blind fastener as claimed in claim 5 wherein said end face of said indenting member tapers towards an apex.

7. A blind fastener as claimed in claim 1 wherein said indenting member comprises a cylindrical disc.

8. A blind fastener as claimed in claim 1 wherein said indenting member has an associated axially inclined forming surface extending between the exterior diameter of said cylindrical shell and said indenting member.

9. A blind fastener as claimed in claim 8 wherein said forming surface extends between said exterior diameter of said cylindrical shell and a base of said step portion.

10. A self-piercing blind fastener comprising:
    a cylindrical shell comprising a radially extending flange at one end and a tail at an opposite end;
    a mandrel comprising a mandrel head in operable engagement of said tail for transferring force thereto during setting of the self-piercing blind fastener, and said cylindrical shell mounted on said mandrel wherein said mandrel extends past said radially extended flange;
    a longitudinally extending piercing member mounted on said mandrel head, said piercing member being substantially cylindrical and having a diameter area less than a diameter area of an outside surface of said cylindrical shell; and
    said piercing member forming a step portion on said mandrel head.

11. The self-piercing blind fastener according to claim 10 wherein said mandrel head has an external diameter that is greater than an internal diameter of said cylindrical shell.

12. The self-piercing blind fastener according to claim 10 wherein said cross-sectional area of said piercing member is less than half cross-sectional area of said outside edge of said cylindrical shell.

13. The self-piercing blind fastener according to claim 10 wherein said longitudinally extending piercing member comprises a cylindrical disc.

14. A self-piercing blind rivet comprising:
    a deformable sleeve comprising a radially extended flange on a first end and a tail on a second end opposite said first end;
    a mandrel having a first end extending beyond said radially extending flange and a mandrel head on a second end opposite said first end, said mandrel head extending beyond said tail, said mandrel head in operable engagement with the said tail for transferring force to said sleeve during the setting of the self-piercing blind fastener;
    a piercing member mounted on said mandrel head and having a side wall longitudinally extending away from said mandrel head, said piercing member having a cross-sectional area less than a cross-sectional area of said mandrel; and
    a forming surface connecting said mandrel head to said piercing member.

15. The self-piercing blind rivet according to claim 14 wherein said piercing member comprises a cylindrical disc.

16. The self-piercing blind rivet according to claim 14 wherein the piercing member comprises a flat face.

17. The self-piercing blind rivet according to claim 14 wherein said piercing member forms a step portion on said mandrel head.

* * * * *

UNITED STATES PATENT AND TRADEMARK OFFICE
CERTIFICATE OF CORRECTION

| | |
|---|---|
| PATENT NO. | : 7,341,413 B2 |
| APPLICATION NO. | : 10/654072 |
| DATED | : March 11, 2008 |
| INVENTOR(S) | : Stephen Morris et al. |

It is certified that error appears in the above-identified patent and that said Letters Patent is hereby corrected as shown below:

<u>Column 14,</u>
Line 54, after "mandrel" insert --head--.

Signed and Sealed this

Tenth Day of March, 2009

JOHN DOLL
*Acting Director of the United States Patent and Trademark Office*